W. H. TONG.
CALIPERS.
APPLICATION FILED OCT. 28, 1913. RENEWED JUNE 4, 1915.
1,166,868.
Patented Jan. 4, 1916.
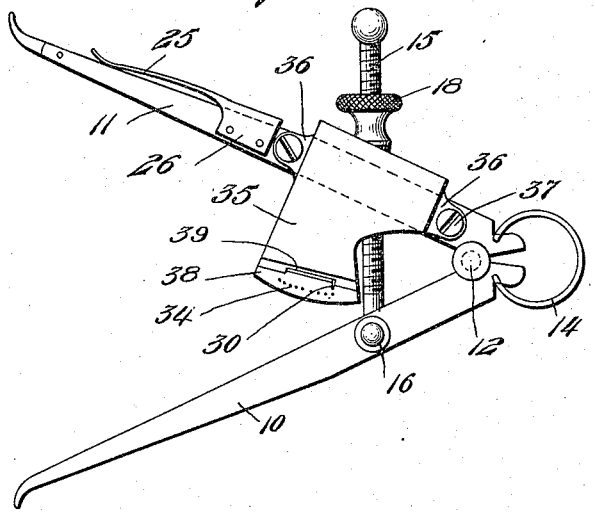
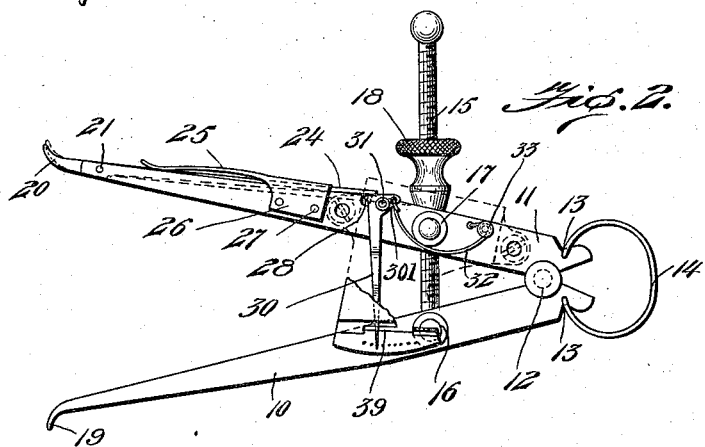
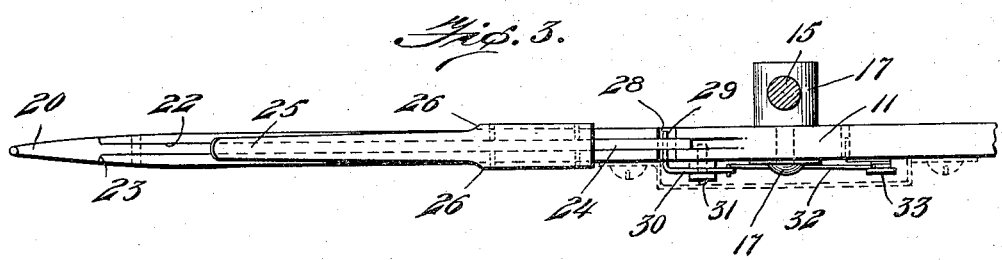

UNITED STATES PATENT OFFICE.

WILLIAM H. TONG, OF ELMIRA HEIGHTS, NEW YORK.

CALIPERS.

1,166,868.        Specification of Letters Patent.        Patented Jan. 4, 1916.

Application filed October 28, 1913, Serial No. 797,878. Renewed June 4, 1915. Serial No. 32,243.

*To all whom it may concern:*

Be it known that I, WILLIAM H. TONG, a citizen of the United States, residing at Elmira Heights, in the county of Chemung and State of New York, have invented certain new and useful Improvements in Calipers, of which the following is a specification.

This invention relates to improvements in calipers, and more particularly to an indicating arrangement therefor.

The principal object of the invention is to provide a simple indicating device in combination with the calipers for indicating slight variations in measurement and arranged so that the differences can be easily ascertained.

Another object is to arrange the indicating device on one of the caliper legs so that when the caliper is raised to a horizontal position the scale will also be disposed in a horizontal position.

Other objects and novel features of the invention will be apparent from the following description, taken in connection with the drawing, in which,—

Figure 1 is a side elevation of a caliper embodying my invention. Fig. 2 is a similar view, parts being broken away to show details of construction. Fig. 3 is an enlarged detail view of part of the caliper leg on which the indicating device is mounted.

The invention, as illustrated in the drawing, is applied to an inside caliper, but it is to be understood that the indicating arrangement may also be applied to an outside caliper, and the invention is not limited in its application to the construction shown.

The caliper comprises a pair of legs 10 and 11 of flat sheet metal recessed at one end to receive the pivot 12 and also having notches 13 to receive the ends of the spring 14 which tends to swing the longer ends of the legs apart about the pivot 12. An adjusting screw 15 is pivotally connected at 16 to the leg 10 and passes loosely through a lug 17 on the leg 11. The stem 15 is threaded nearly its entire length, and is provided at the outer side of the caliper leg 11 with a knurled adjusting screw 18 by means of which the movement of the leg 11 is limited.

The caliper leg 10 is provided with an integral toe 19, whereas the caliper leg 11 is truncated and a toe lever 20 is pivotally mounted at the end thereof, as at 21, so that it can move a slight distance in the plane of the caliper legs.

A slot 22 extends from the end 23 of the caliper leg 11 to a point near the adjusting screw 15. The slot 22 tapers inwardly from the outer end of the leg 11 and receives the inner end 24 of the toe lever 20 and is of such a depth that the latter will be disposed flush with the outer edge of the leg 11 when the toe lever is in its normal position. In order to normally keep the end 24 of the toe lever in the slot 22 a leaf spring 25 is provided which has parts 26 that are bent so as to lie flush against the sides of the caliper leg 11 and are secured to the opposite sides thereof by rivets 27. The end of the spring 25 extends toward the end of the leg 11 and rests upon the toe lever 24 tending to maintain the latter within the slot 22 and limiting the outward movement of the same.

Near the inner end of the slot 22 and extending across the edge of the leg 11 there is a notch 28 which is deeper than the slot. The notch 28 receives a depending portion 29 of the indicating needle or pointer 30 which is pivoted to a pin 31 secured to the leg 11. The extreme inner end of the part 24 of the toe lever extends across the top of the notch 28 and rests in contact with the depending projection 29 of the pointer 30. A spiral spring 32 wound around the pin 33 attached to the leg 11 has one end attached to the projection 301 of the pointer 30 and holds the projection 29 thereof in contact with the under edge of the toe lever 24. The spring 32 tends to turn the pointer about its pivot and whenever the position of the outer end of the toe lever is changed the inner end thereof is raised and the pointer is free to move about its pivot and the end thereof will move across the scale divisions 34 and indicate the slight differences between the setting of the caliper and the actual measurements of the work being operated on.

The casing 35 incloses the pointer 30, the spring 32, and point where the extension 29 enters the notch 28 and is disposed in contact with one face of the lever 11. The casing 35 has ears 36 on opposite sides thereof, and the screws 37 which extend through said ears serve to attach the casing 35 to the caliper leg 11. The scale divisions 34 are arranged on an off-set portion 38 of the casing 35 opposite an opening 39 in a bent portion of the casing 35. The end of the pointer 30 extends through the opening 39 and moves across the scale divisions 34 whenever the toe lever 20 is rocked on its pivot.

The pointer 30 extends across the legs of the caliper which permits positioning the scale division 34 substantially longitudinally of the caliper. When calipering work it is natural to hold the caliper in a horizontal position, and as the scale divisions are substantially horizontal in all positions of the legs when the instrument is held so that the legs are horizontal the arrangement makes it convenient to readily read the differences or slight variations of the measurements.

It will be seen that I have provided a simple and inexpensive arrangement which can be applied to most calipers now in use, and as minor modifications are contemplated I do not wish to be limited to the exact details, as shown and described.

Having thus fully described my invention, what I claim is:

1. A caliper comprising a caliper leg, a member pivoted near the end of said leg and extending longitudinally of the leg and having a part capable of engaging the article to be calipered, a scale mounted on the caliper, a pivoted pointer having a part movable over the scale and controlled by said pivoted member, a spring tending to retain the pivoted member and the pointer in a predetermined position, a second spring acting on said pointer in opposition to the first mentioned spring and tending to move the said part of the pointer over the scale and a companion leg for the said caliper leg.

2. In a caliper, the combination of a pair of caliper legs pivotally connected together, one of said legs comprising a main part, and a toe lever pivotally mounted thereon and having a portion extending beyond said main part, said main part having a slot along one edge into which the other portion of the toe lever fits, yielding means for normally maintaining said toe lever in the slot, an indicating device comprising a pivoted pointer having a part disposed in contact with said pivoted toe lever, a scale over which the free end of said pointer is movable, and means tending to turn the pointer on its pivot and over said scale, said lever normally holding the pointer in position at one end of the scale and arranged to permit the movement of the pointer when the outer end of the same is rocked on its pivot.

3. In a caliper, the combination of a pair of caliper legs pivotally connected together, one of said legs comprising a main part, and a lever pivoted to the main part and having a toe portion extending beyond the end thereof, said main part having a slot extending along one edge to which the inner end of the lever fits, said main part of the leg having a notch therein extending across said slot and deeper than the latter, yielding means for normally maintaining the inner end of said lever in the slot, an indicating device comprising a pointer pivoted adjacent said notch and having a part which extends into the notch and beneath said lever, a scale over which said pointer is movable and disposed substantially longitudinally of the caliper, and means tending to turn said pointer on its pivot, said lever normally holding the pointer in position at one end of the scale and arranged to release the pointer so that it may move over the scale to indicate slight differences of measurements when the toe portion of the lever is rocked.

4. In a caliper, the combination of a pair of pivotally connected caliper legs, one of said legs comprising a truncated portion having a groove extending along one edge and a lever pivoted in said groove near the end of the truncated portion, a scale plate mounted on the caliper, a pivoted pointer extending substantially transversely of the caliper legs, a spring tending to move one end of the pointer over the scale divisions, said lever engaging the pointer, and a spring tending to maintain part of the lever in the groove and said pointer at one end of said scale.

5. In a caliper, the combination of a pair of pivotally connected caliper legs, one of said legs comprising a truncated portion having a groove extending along one edge and a lever pivoted in said groove, a scale on the caliper, a pivoted pointer controlled by said lever, and means whereby the free end of said pointer is caused to move over the scale divisions when said lever is rocked on its pivot.

6. In a caliper, the combination of a pair of pivotally connected caliper legs, means for adjusting the legs relatively to each other, a lever pivoted on and extending longitudinally of and beyond the end of one of the legs, a scale on one of the legs and extending longitudinally of the caliper, a pivoted pointer having its free end movable over said scale and extending transversely of both caliper legs and across the latter when the caliper is closed, and means whereby the free end of the pointer is caused to move over the scale divisions when said lever is rocked on its pivot.

In testimony whereof I affix my signature in presence of two witnesses.

WILLIAM H. TONG.

Witnesses:
A. S. WINEN,
EDNA L. TORREY.

Copies of this patent may be obtained for five cents each, by addressing the "Commissioner of Patents, Washington, D. C."